United States Patent
Ghazi et al.

(10) Patent No.: US 10,588,470 B2
(45) Date of Patent: Mar. 17, 2020

(54) OPTICAL PRODUCT USE DETERMINATION SYSTEM

(71) Applicant: Kimberly-Clark Worldwide, Inc., Neenah, WI (US)

(72) Inventors: Babak R. Ghazi, Smyrna, GA (US); Frederick J. Williams, Jr., Cumming, GA (US); Stephen Becker, Cumming, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 224 days.

(21) Appl. No.: 15/527,626

(22) PCT Filed: Aug. 5, 2016

(86) PCT No.: PCT/US2016/045706
§ 371 (c)(1),
(2) Date: May 17, 2017

(87) PCT Pub. No.: WO2018/004705
PCT Pub. Date: Jan. 4, 2018

(65) Prior Publication Data
US 2019/0082898 A1    Mar. 21, 2019

Related U.S. Application Data

(60) Provisional application No. 62/357,249, filed on Jun. 30, 2016.

(51) Int. Cl.
| | | |
|---|---|---|
| A47K 10/44 | (2006.01) | |
| G06T 7/73 | (2017.01) | |
| G01B 11/14 | (2006.01) | |
| G08B 21/18 | (2006.01) | |
| A47K 10/42 | (2006.01) | |
| A47K 10/32 | (2006.01) | |
| G06T 7/13 | (2017.01) | |

(52) U.S. Cl.
CPC .............. *A47K 10/44* (2013.01); *A47K 10/32* (2013.01); *A47K 10/42* (2013.01); *A47K 10/424* (2013.01); *G01B 11/14* (2013.01); *G06T 7/73* (2017.01); *G08B 21/182* (2013.01); *G06T 7/13* (2017.01)

(58) Field of Classification Search
CPC ...... A47K 10/44; A47K 10/424; G01B 11/14; G06T 7/13; G06T 7/73; G08B 21/182
See application file for complete search history.

(56) References Cited

U.S. PATENT DOCUMENTS

| | | | |
|---|---|---|---|
| 2003/0088337 A1* | 5/2003 | Watanabe | G06T 7/74 700/259 |
| 2011/0210137 A1 | 9/2011 | Kling | |
| 2012/0203376 A1* | 8/2012 | Savage | B25H 3/00 700/214 |
| 2013/0099924 A1 | 4/2013 | Larsson et al. | |
| 2013/0119183 A1 | 5/2013 | Cattacin et al. | |

(Continued)

FOREIGN PATENT DOCUMENTS

| | | |
|---|---|---|
| CN | 101281022 A | 10/2008 |
| CN | 101883514 A | 11/2010 |

*Primary Examiner* — Gene O Crawford
*Assistant Examiner* — Kelvin L Randall, Jr.

(57) ABSTRACT

Methods, systems and apparatus for optically determining the amount of product used and/or remaining in a product dispenser.

13 Claims, 3 Drawing Sheets

(56) References Cited

U.S. PATENT DOCUMENTS

| | | |
|---|---|---|
| 2013/0240554 A1 | 9/2013 | Svedlund et al. |
| 2014/0367401 A1* | 12/2014 | Stralin .................. A47K 10/22 221/6 |
| 2015/0310694 A1* | 10/2015 | Will ...................... G07F 11/165 221/13 |
| 2019/0184267 A1* | 6/2019 | Shigeta ..................... A63F 1/02 |

* cited by examiner

OPTICAL PRODUCT USE DETERMINATION SYSTEM

This application claims the benefit of priority from U.S. Provisional Application No. 62/357,249 filed on Jun. 30, 2016, which is incorporated in its entirety by reference.

This disclosure relates to optically determining the amount of and/or type of product in a dispenser.

BACKGROUND

Systems dispensing consumable products are ubiquitous in many environments today. For example, hand towel dispensers are commonplace in many semi-private and public washrooms and break rooms. Determining how much product remains in a dispenser and, thus, when it needs to be refilled can be a time consuming and laborious endeavor requiring, in some scenarios, that an attendant or building maintenance team member check the dispensers on a set schedule and refill as needed. This process may result in checking the dispenser and determining that (1) no refill is require, resulting in an unnecessary visit to the dispenser, which leads to building management inefficiencies and additional costs, or (2) the dispenser is empty, resulting in frustrated users.

SUMMARY

In general, the subject matter of this specification relates to optically determining how much product remains in a dispenser, e.g., a folded hand towel dispenser, or the authenticity of the product. In general, one aspect of the subject matter described in this specification can be implemented in systems that include a dispenser comprising a body to hold consumable products, the body having an upper portion and a lower portion, the lower portion having a dispensing opening through which the consumable products are dispensed to a user, and where the consumable products have a top portion and the top portion has an identification mark, and as the consumable products are dispensed the top portion and identification mark move away from the upper portion of the body; an optical device proximate the upper portion and configured to capture at least a partial image of the identification mark; and a processing device in data communication with the optical device and configured to determine a characteristic of the image, and at least one of a match status of the image to an image signature and an amount of the consumable products remaining. Other embodiments of this aspect include corresponding systems, apparatus, and methods.

Yet another aspect of the subject matter described in this specification can be implemented in methods that include generating, by an optical sensor, an image of an identification mark on a top portion of a consumable product in a paper product dispenser; analyzing, by a processing device, the image to determine a characteristic of the image; and determining an amount of the consumable product remaining based on the characteristic. Other embodiments of this aspect include corresponding systems, apparatus, and computer program products.

In some implementations, the methods, systems, apparatus, and computer program products described herein have the following features, including where the consumable products are stacked, folded hand towels. The top portion is a top one of the stacked, folded hand towels. The optical device is a camera. The identification mark is a trademark of a provider of the consumable products. The identification mark is a design element of the consumable products. The design element is a printed or embossed pattern. The characteristic of the image is one or more of sharpness, intensity, edge gradient, focal length of the optical device relative to the identification mark or focal distance between the optical device and identification mark, feature matching, correlation and similarity to the identification mark.

The partial image of the identification mark is a photograph of at least a portion of the identification mark. The processing device determines the amount of the consumable products remaining based on a distance between the optical device and the identification mark. The processing device is configured to determine the amount of the consumable products remaining based on a relative size of the identification mark in a viewing field of the optical device. The processing device is configured to determine the amount of consumable products remaining based on the size of the identification mark as compared with one or more templates that each correspond to a different amount of product remaining. The processing device is configured to generate an alert in response to determining that the match status is false indicating that the image does not match the image signature. The processing device is configured to prevent dispensing in response to determining that the match status is false indicating that the image does not match the image signature.

Particular embodiments of the subject matter described in this specification can be implemented so as to realize one or more of the following advantages. For example, the level or amount of product remaining can be determined without requiring an attendant to open and physically check the dispenser. Further, the product level/amount sensing system does not require a mechanical trigger or lever (e.g., a lever arm resting on the product that moves down as product is depleted) be reset or calibrated by the attendant when the product is refilled, which reduces errors in determining the amount of product remaining and/or used.

Because the product level/amount sensing system uses optical detection techniques, the system can detect not only the amount of product remaining and/or used but also identify the type of product based on known characteristics of the product. Such detection can be used, for example, to specifically identify the type of product (e.g., Product A from Manufacturer B or Product C from Manufacturer D). This functionality can be used to prevent dispensing (or alert an attendant) if a non-compatible or unauthorized product is inserted into the dispenser.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

The present disclosure generally relates to optically determining how much product remains in a dispenser, e.g., a folded hand towel dispenser.

In some implementations, the dispenser uses an optical device, e.g., a camera, to determine the amount of product remaining, e.g., stacked hand towels, in a product dispenser. For example, the dispenser uses characteristics of an identification mark on the product (e.g., size of the product logo in the optical device's field of view or an image processing variable such as resolution or sharpness) to make such a determination.

As the product is depleted less product remains and the product level in the dispenser corresponding lowers. In turn, in this example, the identification mark on the product will appear smaller to a camera mounted near the top of the dispenser as the product level lowers and the product (and the mark(s) on the product(s)) moves further away from the camera.

The operation of such a product use determination system is described in more detail below with reference to FIGS. 1A, 1B, 2A and 2B.

Figure 1A:
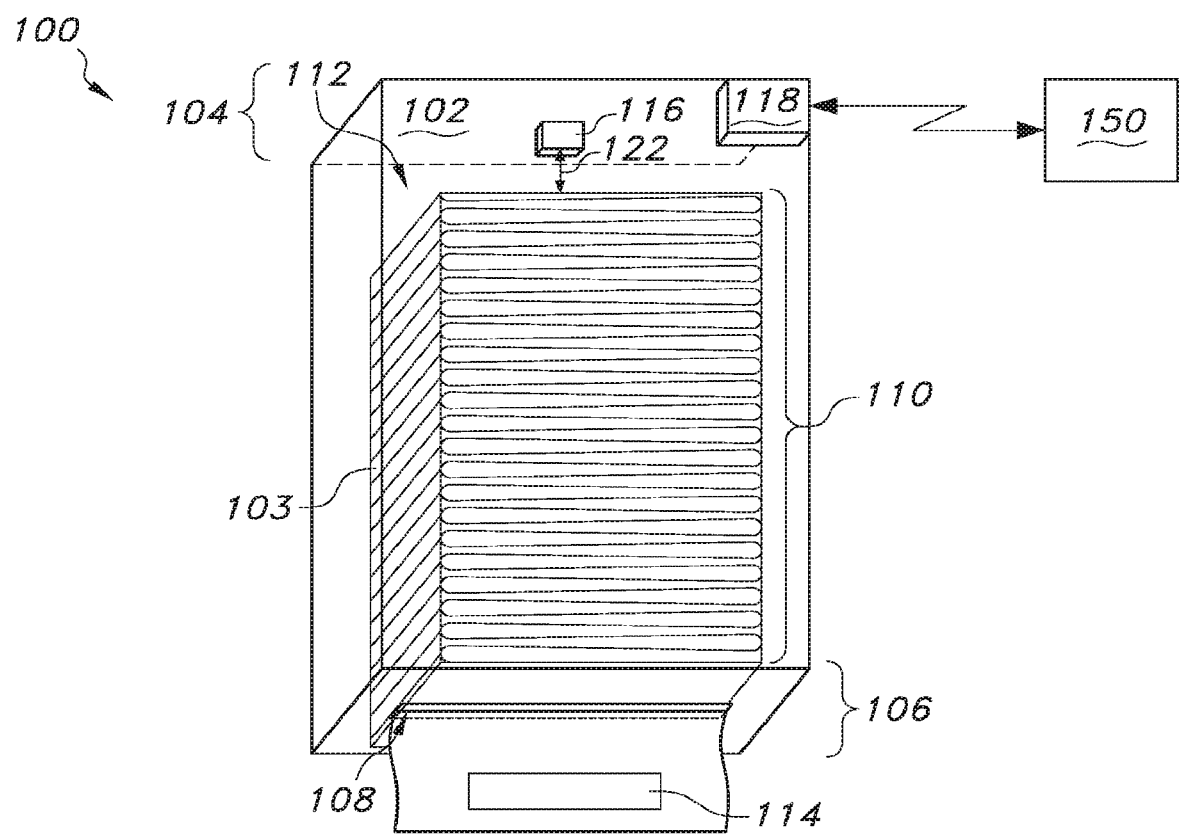
FIG. 1A is a representation of an example product dispenser with a first amount of product.

FIG. 1A is a representation of an example product dispenser 100 with a first amount 110 of product 103. In some implementations, the dispenser 100 has a body 102 to hold consumable products 103. For example, the dispenser 100 can be a wipe/wiper, hand towel, facial or bath tissue dispenser 100, and the product 103 can correspondingly be wipes/wipers, rolled or stacked (and optionally folded) hand towels, stacked facial tissue or rolled bath tissue. The dispenser 100 can, for example, be made of composite and/or metallic materials and can manually and/or automatically dispense product 103.

The body includes an upper portion 104 (e.g., the portion closest to the ceiling of a washroom or break room) and a lower portion 106 (e.g., the portion closest to the floor of a washroom or break room). In some implementations, the lower portion 106 has a dispensing opening 108 through which the consumable product 103 is dispensed to a user. In other implementations, the dispensing opening 108 can, for example, be on the front cover or portion of the dispenser 100.

The consumable products 103 have a top portion 112. For example, the folded and stacked hand towels of FIG. 1A have a top portion 112 closest to the upper portion 104 of the dispenser 100. In some implementations, the top portion 112 is the one hand towel (or tissue or wipe/wiper) at the top of the stack nearest the upper portion 104. In implementations where the product 103 is a rolled product such as bath tissue or rolled hand towels, the top portion 112 is the section of roll (or sheet) closest to the upper portion 104.

As described above, the top portion 112 has an identification mark 114. In some implementations, the identification mark 114 is a trademark or logo of a provider of the consumable products 103 or is a design element of the consumable products 103 such as a portion or all or a printed or embossed pattern on the product 103.

The dispenser 100 includes an optical device 116 proximate the upper portion 104. In some implementations, the optical device 116 is a camera or other imaging device that is positioned and oriented to capture images or identify or detect characteristics or features of the identification mark 114 on the product 103. For example, the optical device 116 can take a picture/photograph of the identification mark and/or can otherwise generate an optical representation of the identification mark 114 (e.g., contrast or line/edge map or rendering).

Figure 2A:
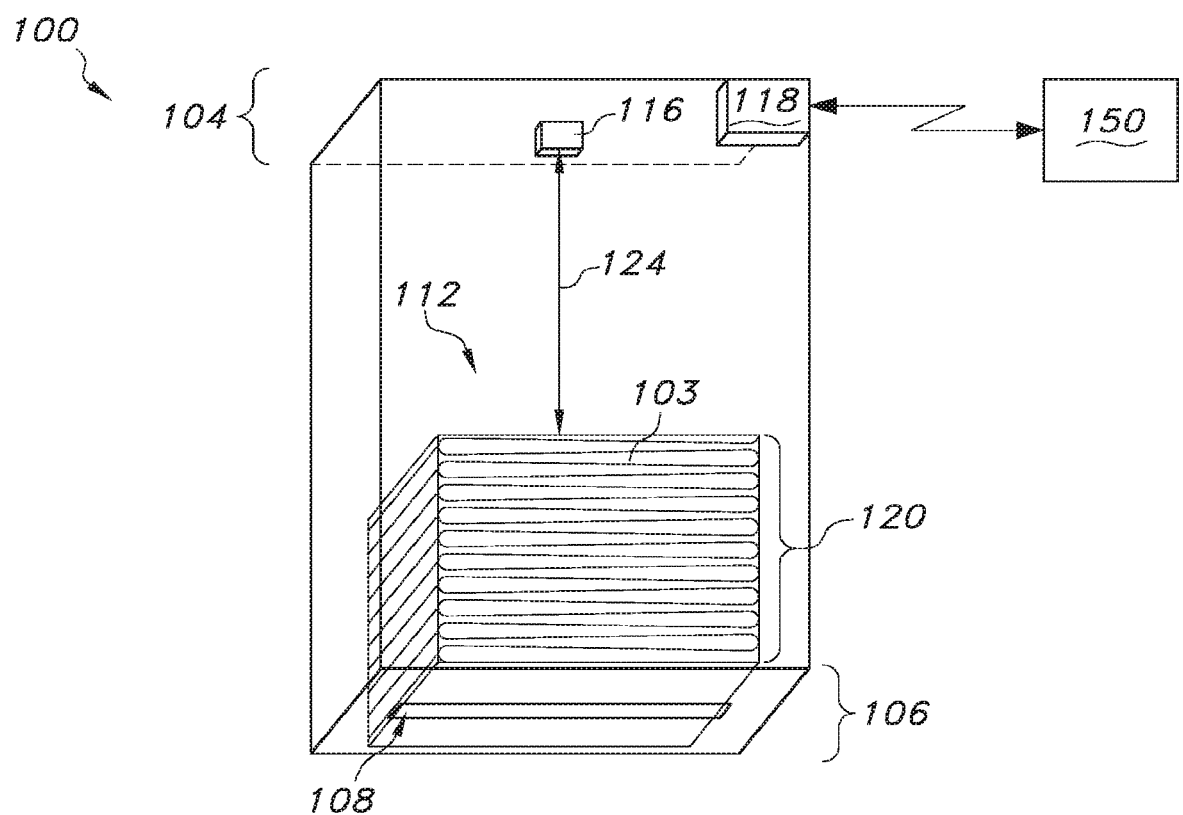
FIG. 2A is a representation of the example product dispenser of FIG. 1A with a second amount of product.

During operation of the dispenser 100 and depletion of the products 103, the top portion 112 and, thus, the identification mark 114 move away from the upper portion 104 of the body 102 as the product 104 is dispensed out of the bottom of the dispenser 100 through the opening 108, which lowers the level of the product 103, as shown in FIG. 2A.

FIG. 2A is a representation of the example product dispenser 100 with a second amount 120 of product 103. The amount 120 of product 103 shown in FIG. 2A is less than the amount 110 of FIG. 1A meaning less product 103 is remaining in FIG. 2A than FIG. 1A. Thus FIG. 1A represents the dispenser substantially full of product 103 and FIG. 2A represents the dispenser 100 after some product 103 has been dispensed and thus has less product 103 remaining. In the context of a rolled product 103, the same would hold true—the diameter of the rolled product 103 decreases with use, which causes the outer surface of the rolled product 103 to be further away from the upper portion 104 as the product 103 is dispensed.

Accordingly, the distance between the optical device 116 and the identification mark 114 changes as the product 103 is depleted. For example, in FIG. 1A the distance between the optical device 116 and the identification mark 114 is distance 122. In FIG. 2A, after more product has been depleted/used, the distance between the optical device 116 and the identification mark 114 is distance 124, which is greater than distance 122.

Figure 1B:
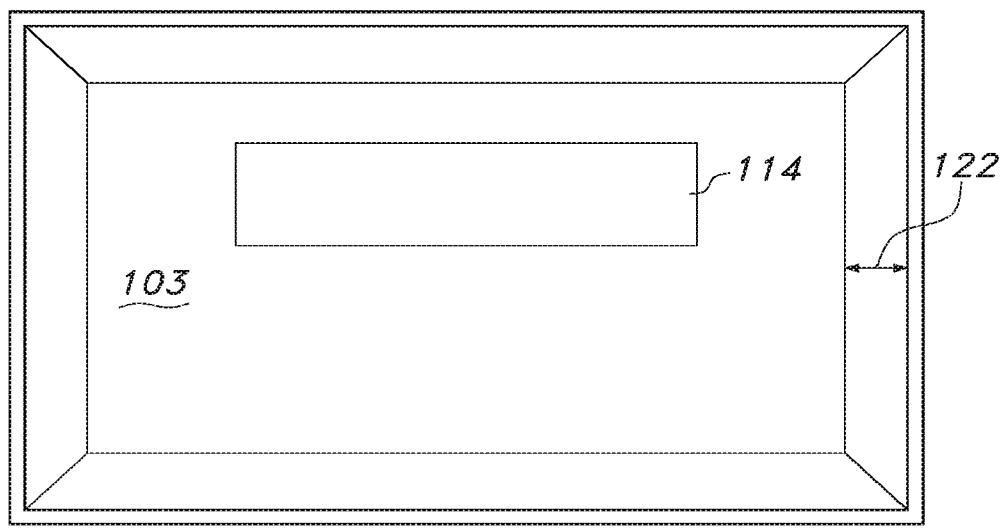
FIG. 1B is a representation of the example identification mark of the product of FIG. 1A.
Figure 2B:
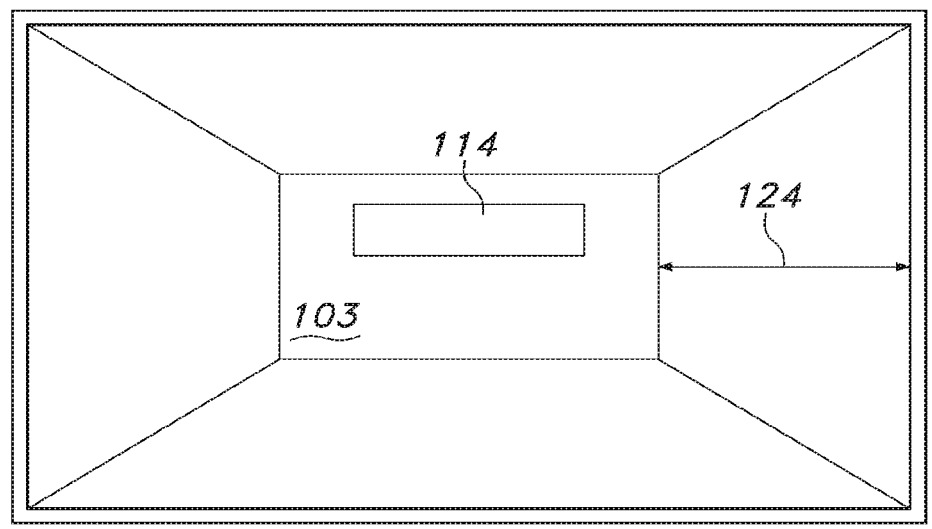
FIG. 2B is a representation of the example identification mark of the product of FIG. 2A.

The effect of this increased distance is reflected in FIGS. 1B and 2B. FIG. 1B is a representation of the example identification mark 114 of the product 103 of FIG. 1A and FIG. 2B is a representation of the example identification mark 114 of the product 103 of FIG. 2A. For example, this effect can be detected based on the relative size of the identification mark 114 the viewing field of the optical device 116. More particularly, the relative portion of the viewing field occupied by the mark 114 changes based on the distance between the optical device 116 and the mark 114, which is shown by the mark 114 occupying a greater portion of the viewing field in FIG. 1B as compared with FIG. 2B because the mark 114 is closer to the optical device in FIG. 1B.

In some implementations the dispenser 100 includes a processing device 118 while in other implementations the processing device 118 is remote to the dispenser 100. In either case, the processing device 118 is in data communication with the optical device 116, either directly or indirectly, and can determine or identify a characteristic of the image (e.g., captured by the optical device 116), determine a match status of the image to an image signature (e.g., stored in a memory of the processing device 118) and/or determine an amount of the consumable product 103 remaining.

In some implementations, the processing device 118 can determine or identify a characteristic of the image such as through feature (e.g., edge) detection techniques in the image processing field (e.g., Canny edge detection, Harris & Stephens/Plessey/Shi-Tomasi corner detection). Such feature detection can facilitate matching the image of the mark 114 for purposes of authenticating the mark 114 and/or determining how much product 103 remains, as described below.

In some implementations, the processing device 118, for example, can determine a match status of the image to a known signature of the image (e.g., a known feature or characteristic of the mark 114 such as its overall shape, edge patterns, corners, and/or particular patterns or colors or gradient variations, etc.). The known signature(s) can be stored in the processing device's memory. For example, the processing device 118 can use template matching and convolution to determine whether the image of the mark 114 captured by the optical device 116 matches the one or more known signatures of the mark 114. In some implementations, this matching process includes comparing multiple image signatures to the captured image to determine whether there is a match. If the number of matches and/or other confidence metric does not exceed a minimum threshold then the processor 118 determines there is no match. Conversely, if the processing device 118 determines that the threshold is met or exceeded then the processing device 118 determines there is a match.

In some implementations, if the processing device 118 determines there is no match (e.g., a false match status), the processing device 118 generates an alert, which can be sent (e.g., wirelessly) to the data processing system 150 or to a mobile device of a service attendant or building manager, indicating that the product 103 in the dispenser 100 is not authentic or authorized (e.g., the product is from a different manufacturer or source). Further, for example, the processing device 118 can prevent dispensing in response to determining that the match status is false, as unauthorized product may not dispense correctly through the dispenser 100 causing dispensing errors and/or jams that affect the operability of the dispenser 100. For example, for automated dispensers 100, the processing device 118 can stop the dispensing actuator motor from turning and causing product 103 to be dispensed to prevent dispensing unauthorized product 103.

As mentioned above, in some implementations, the processing device 118 determines the amount of the product 103 remaining. For example, based on a relative size of the identification mark 114 in a viewing field of the optical device 116, the processing device 118 determines the amount of product 103 remaining by comparing this relative size with one or more templates of the mark 114 in the viewing field that each correspond to a different amount of product 103 remaining. For example, the processing device 118 stores three such templates: a first where the mark occupies 100% of the viewing field and corresponds to a full dispenser 100 (i.e., no product 103 used), a second where the mark occupies 50% of the viewing field and corresponds to a half-full dispenser 100 (i.e., half of the product has been used and half remains), and a third where the mark occupies 10% of the viewing field and corresponds to a nearly empty dispenser 100 (i.e., very little product remains). The processing device 118 determines how much product remains by comparing these templates with the images from the optical device 116. If the processing device 118 matches (e.g., within some tolerance) the image with the first template then it determines that no or very little product has been used. Likewise, if the processing device 118 matches the image with the third template then it determines that very little product remains and, for example, sends an alert to a building manager/system or attendant that the dispenser 100 needs to be refilled. In some implementations, there are many templates to provide higher granularity as to the amount of product 103 remaining.

The processing device 118, in some implementations, determines the amount of the consumable product 103 remaining based on a distance between the optical device 116 and the identification mark 114. For example, based on the focal length of the device 116 relative to the mark 114 the processing device 118 can determine such distance. Based on this distance the processing device 118 can determine how much product 103 remains. Thus, by way of example, if the distance is two inches the processing device 118 determines that very little or no product has been used. Conversely, if the distance is twelve inches the processing device 118 determines that very little product remains and the dispenser 100 should be refilled.

Similarly, other image processing techniques based on sharpness, intensity, edge gradient, correlation and/or similarity to the identification mark 114 can be used to determine the amount of product 103 remaining or authenticity of the product 103.

In some implementations, the dispenser 100 includes a data communication device (e.g., transmitter or transceiver) that operates to communicate with other devices (e.g., through wired or wireless channels or some combination thereof). The data communication device 116 can use any number of communication protocols including, for example, WIFI, BLUETOOTH and TCP/IP to name a few.

Figure 3:
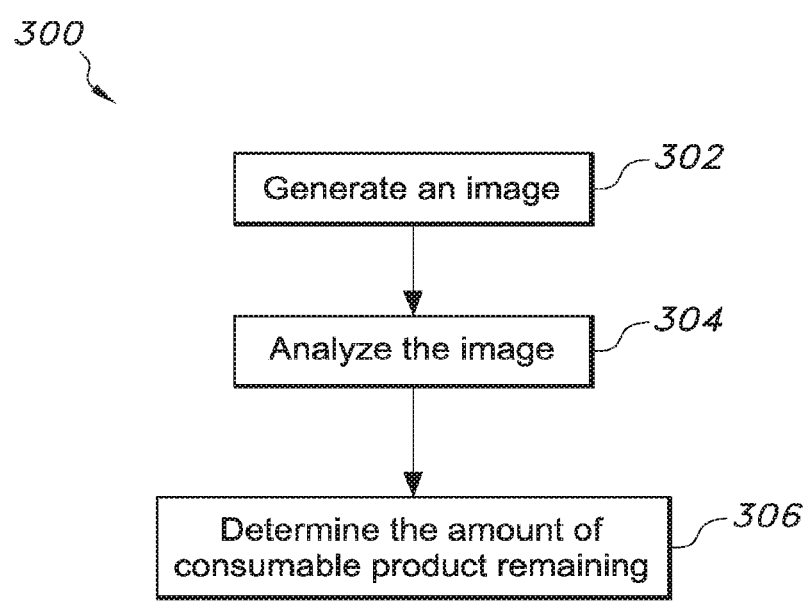
FIG. 3 is a flow chart of an example process for optically determining an amount of product remaining and/or used in a product dispenser.

FIG. 3 is a flow chart of an example process 300 for optically determining an amount of product 103 remaining and/or used in a product dispenser 100.

An image of an identification mark on a top portion of a consumable product in a paper product dispenser is generated (302). For example, the optical device 116 generates the image of the identification mark 114.

The image is analyzed to determine a characteristic of the image (304). For example, the processing device 118 analyzes the image.

An amount of the consumable product remaining is determined based on the characteristic (306). For example, the processing device 118 determines the amount of product remaining.

In some implementations the optical device 116 and the processing device 118 can be retrofitted to an existing dispenser, e.g., previously manufactured without such capability and/or already installed in a washroom or other facility. In this way, for example, the capability to optically determine product remaining and/or used can be provided to an installed dispenser base. In some implementations, the optical device 116 and the processing device 118 can be installed to a dispenser without such devices and/or capability by adhesive tape, with screws or bolts, or the like. The relevant distances (e.g., 122 and 124), whether in retrofit applications or otherwise, for each unique dispenser and identification mark 114 can be calibrated and programmed into the processing device 118.

As described above, the dispenser 100 may include a data processing system 150. The data processing system 150 can be part of or separate (e.g., remote) from the dispenser 100. In implementations where the data processing system 118 is remote from the dispenser 100, the system 150 and dispenser 100 can communicate across wireless or wired channels, or some combination thereof. For example, the data processing system 118 includes a transceiver and microprocessor to facilitate such communications. In some implementations, the data processing system 150 is connected to a WAN or LAN to communicate to and with other devices such as mobile devices and/or servers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A dispenser comprising:
   a body to hold consumable products, the body having an upper portion and a lower portion, the lower portion having a dispensing opening through which the consumable products are dispensed to a user, and wherein:
      the consumable products have a top portion and the top portion has an identification mark, and
      as the consumable products are dispensed the top portion and identification mark move away from the upper portion of the body;
   an optical device proximate the upper portion and configured to capture at least a partial image of the identification mark; and
   a processing device in data communication with the optical device and configured to determine:
      a characteristic of the image,
      at least one of a match status of the image to an image signature and an amount of the consumable products remaining; and
      wherein the processing device is configured to generate an alert in response to determining that the match status is false indicating that the image does not match the image signature.

2. The dispenser of claim 1, wherein the consumable products are stacked, folded hand towels.

3. The dispenser of claim 2, wherein the top portion is a top one of the stacked, folded hand towels.

4. The dispenser of claim 1, wherein the optical device is a camera.

5. The dispenser of claim 1, wherein the identification mark is a trademark of a provider of the consumable products.

6. The dispenser of claim 1, wherein the identification mark is a design element of the consumable products.

7. The dispenser of claim 6, wherein the design element is a printed or embossed pattern.

8. The dispenser of claim 1, wherein the characteristic of the image is one or more of sharpness, intensity, edge gradient, focal length of the optical device relative to the identification mark, feature matching, correlation and similarity to the identification mark.

9. The dispenser of claim 1, wherein the partial image of the identification mark is a photograph of at least a portion of the identification mark.

10. The dispenser of claim 1, wherein the processing device determines the amount of the consumable products remaining based on a distance between the optical device and the identification mark.

11. The dispenser of claim 1, wherein the processing device is configured to determine the amount of the consumable products remaining based on a relative size of the identification mark in a viewing field of the optical device.

12. The dispenser of claim 11, wherein the processing device is configured to determine the amount of consumable products remaining based on the size of the identification mark as compared with one or more templates that each correspond to a different amount of product remaining.

13. A dispenser comprising:
   a body to hold consumable products, the body having an upper portion and a lower portion, the lower portion having a dispensing opening through which the consumable products are dispensed to a user, and wherein:
      the consumable products have a top portion and the top portion has an identification mark, and
      as the consumable products are dispensed the top portion and identification mark move away from the upper portion of the body;
   an optical device proximate the upper portion and configured to capture at least a partial image of the identification mark; and
   a processing device in data communication with the optical device and configured to determine:
      a characteristic of the image,
      at least one of a match status of the image to an image signature and an amount of the consumable products remaining; and
      wherein the processing device is configured to prevent dispensing in response to determining that the match status is false indicating that the image does not match the image signature.

* * * * *